United States Patent
Inuzuka

(10) Patent No.: US 10,384,637 B2
(45) Date of Patent: Aug. 20, 2019

(54) GAS PRESSURE ACTUATOR

(71) Applicant: Takata Corporation, Tokyo (JP)

(72) Inventor: Koji Inuzuka, Shiga (JP)

(73) Assignee: JOYSON SAFETY SYSTEMS JAPAN K.K., Tokyo (JP)

(*) Notice: Subject to any disclaimer, the term of this patent is extended or adjusted under 35 U.S.C. 154(b) by 109 days.

(21) Appl. No.: 15/559,561

(22) PCT Filed: Jan. 26, 2016

(86) PCT No.: PCT/JP2016/052150
§ 371 (c)(1),
(2) Date: Sep. 19, 2017

(87) PCT Pub. No.: WO2016/157967
PCT Pub. Date: Oct. 6, 2016

(65) Prior Publication Data
US 2018/0043855 A1    Feb. 15, 2018

(30) Foreign Application Priority Data
Mar. 31, 2015   (JP) ................................ 2015-074285

(51) Int. Cl.
*F15B 15/14*   (2006.01)
*B60R 21/38*   (2011.01)
(Continued)

(52) U.S. Cl.
CPC .......... *B60R 21/38* (2013.01); *B60R 21/0136* (2013.01); *F15B 15/14* (2013.01);
(Continued)

(58) Field of Classification Search
CPC .................. B60R 21/38; B60R 21/036; B60R 2021/0004; F15B 15/19
See application file for complete search history.

(56) References Cited

U.S. PATENT DOCUMENTS

| 7,357,212 B2 | 4/2008 | Sasaki et al. |
| 7,475,752 B2 * | 1/2009 | Borg ....................... B60R 21/38 |
| | | 180/274 |

FOREIGN PATENT DOCUMENTS

| DE | 102009057895 | 6/2011 |
| DE | 102005040358 | 2/2013 |

(Continued)

OTHER PUBLICATIONS

International Search Report for PCT/JP2016/052150 dated Apr. 19, 2016.

*Primary Examiner* — Thomas E Lazo
(74) *Attorney, Agent, or Firm* — IPUSA, PLLC

(57) ABSTRACT

A gas pressure actuator includes a cylindrical housing, a piston rod; the piston rod being accommodated inside the housing prior to driving the gas pressure actuator; a gas generator arranged at one end side in an axial direction of the housing, wherein, during driving the gas pressure actuator, the gas generator causes the piston rod to extend from the housing by generating high pressure gas; and a holding assembly that secures the gas generator to the one end side in the axial direction of the housing, wherein the holding assembly is provided with a first coupler hole for coupling the gas pressure actuator to a first hinge at a first position on an axis line of the gas pressure actuator.

5 Claims, 13 Drawing Sheets

(51) Int. Cl.
*F15B 15/19* (2006.01)
*B60R 21/0136* (2006.01)
*B60R 21/00* (2006.01)
*B60R 21/01* (2006.01)
*F15B 15/20* (2006.01)

(52) U.S. Cl.
CPC ...... *F15B 15/19* (2013.01); *B60R 2021/0004* (2013.01); *B60R 2021/01252* (2013.01); *F15B 2015/206* (2013.01)

(56) References Cited

FOREIGN PATENT DOCUMENTS

| | | |
|---|---|---|
| EP | 1470971 | 5/2008 |
| EP | 1338483 | 4/2009 |
| JP | 2004-322735 | 11/2004 |
| JP | 2010-030496 | 2/2010 |
| JP | 4548151 | 9/2010 |
| JP | 5050677 | 10/2012 |
| JP | 5644727 | 12/2014 |
| JP | 5952747 | 7/2016 |

\* cited by examiner

GAS PRESSURE ACTUATOR

TECHNICAL FIELD

An aspect of the present disclosure relates to a gas pressure actuator.

BACKGROUND ART

An actuator has been known that is used for a safety device for an automobile (cf. Patent Document 1, for example). The actuator described in Patent Document 1 includes a housing, which is a cylindrical cylinder; a piston rod; and a gas generator. The gas generator is positioned at one end side of the housing in an axial direction. Further, prior to driving, the piston rod is accommodated in an inner part of the housing, and, during driving, the piston rod extends out from the other end side of the housing in the axial direction while sliding along an inner wall of the housing.

In the above-described actuator, upon generating high pressure gas in the gas generator, the high pressure gas acts on a surface of the piston rod that faces the gas generator at the one end side in the axial direction, so that the piston rod is pressed toward the other end side in the axial direction. In this case, the piston rod extends out from the other side of the housing in the axial direction while sliding along the inner wall of the housing, so that the actuator extends in the axis direction.

RELATED-ART DOCUMENTS

Patent Document

[Patent Document 1] Japanese Unexamined Patent Publication No. 2004-322735

SUMMARY OF THE INVENTION

Problem to be Solved by the Invention

Note that, as described above, the actuator used for the safety device for the vehicle is connected to a hinge that is formed in a vehicle body. As a method of connecting the actuator to the vehicle body, a structure is considered such that a bolt is passed through a hole formed in the housing of the actuator, and the bolt is attached to the vehicle hinge. However, for such a structure, it is required to form a hole in the housing that is a pressure container. Consequently, due to the existence of the hole in the housing, prior to generating the gas by the gas generator, namely, prior to driving the actuator, it becomes difficult to ensure dust resistance and drip-proofness; and during generating the gas by the gas generator, namely, during driving the actuator, high pressure gas tends to leak from inside the housing, so that it becomes difficult to maintain the high pressure inside the housing.

In order to avoid the above-described problem, as a method of connecting the actuator to the vehicle hinge, a structure may be considered such that a bracket having a shape surrounding an outer circumference of the housing is attached to the housing, and the bracket is secured to the vehicle hinge. However, in such a structure, when a connecting hole, into which a bolt, etc., for securing the bracket to the vehicle hinge is to be inserted, is located at a position offset from an axis line of the actuator, a large moment acts on the actuator around the connecting hole during driving. For this reason, in such a structure, a measure is required, such as strengthening the bracket, so that the bracket is not buckled, etc., during driving the actuator.

According to an aspect of the present disclosure, a gas pressure actuator can be provided that can reduce a moment that acts during driving, while ensuring dust resistance, drip-proofness, and airtightness of a housing.

Means to Solve the Problem

According to an aspect of the present disclosure, there is provided a gas pressure actuator including a cylindrical housing; a piston rod that is accommodated in a inner part of the housing prior to driving the gas pressure actuator; a gas generator disposed at one end side of the housing in an axial direction, wherein the gas generator is configured to, during driving the gas pressure actuator, generate high pressure gas so as to cause the piston rod to extend out from the housing; and a holding member configured to secure the gas generator to one end side of the housing in the axial direction. The holding member is provided with a first connecting hole for connecting the gas pressure actuator to a first hinge at a first position on an axial line of the gas pressure actuator.

Advantage of the Invention

According to an aspect of the present disclosure, a moment that acts during driving can be reduced, while ensuring dust resistance, drip-proofness, and a high pressure maintaining property of a housing of a gas pressure actuator.

MODE FOR CARRYING OUT THE INVENTION

In the following, a gas pressure actuator according to an embodiment of the present invention is described using the drawings.

First Embodiment

Figure 1:
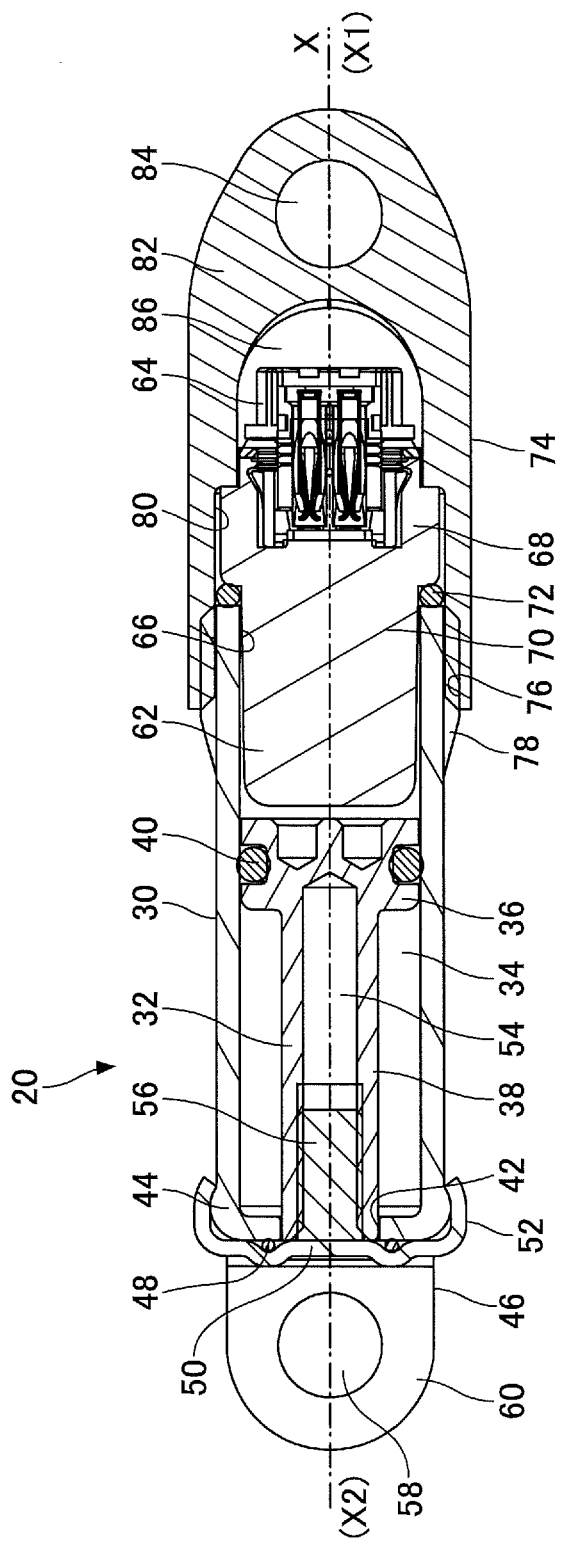
FIG. 1 is a cross-sectional view of a gas pressure actuator according to a first embodiment.
Figure 2:
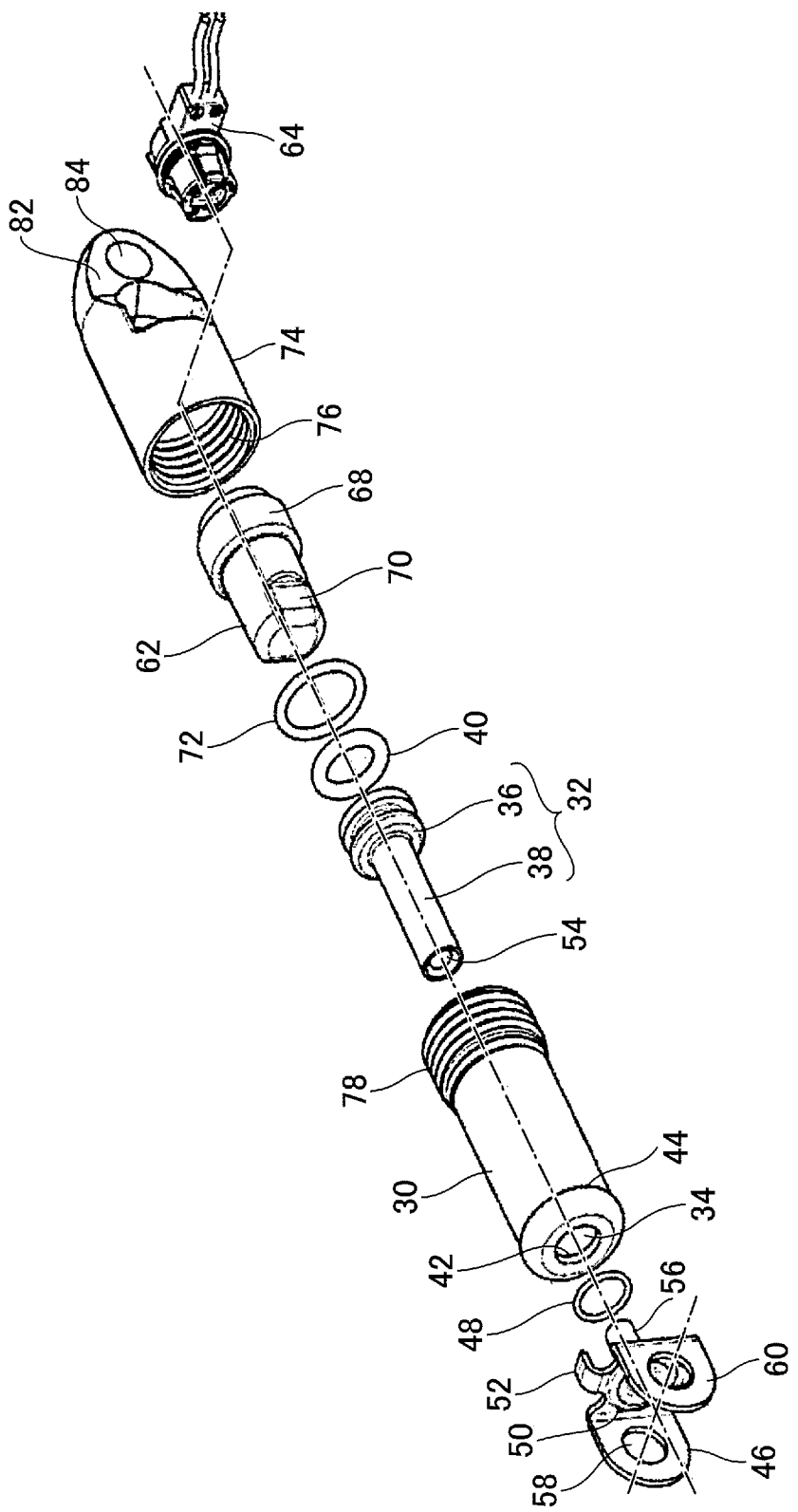
FIG. 2 is an exploded perspective view of the gas pressure actuator according to the first embodiment.
Figure 3:
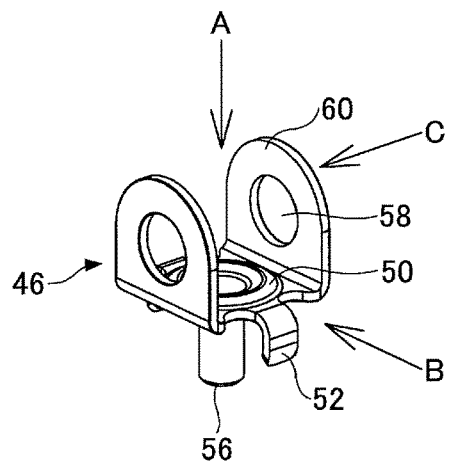
FIG. 3 is a perspective view of a head assembly included in the gas pressure actuator according to the first embodiment.
Figure 4A:
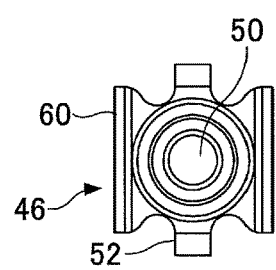
FIG. 4A is a top view of the head assembly included in the gas pressure actuator according to the first embodiment.
Figure 4B:
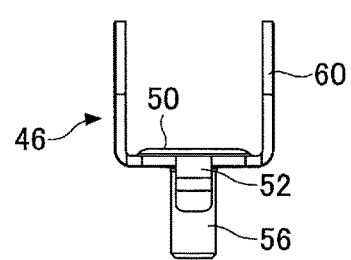
FIG. 4B is a side view of the head assembly included in the gas pressure actuator according to the first embodiment.
Figure 4C:
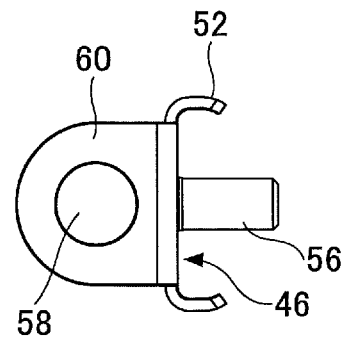
FIG. 4C is a side view of the head assembly included in the gas pressure actuator according to the first embodiment.
Figure 5:
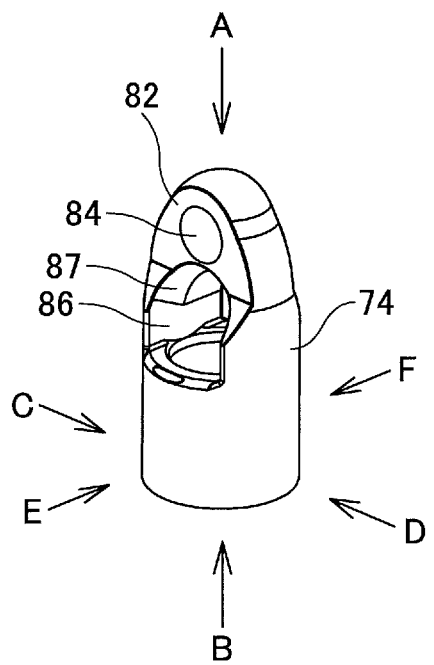
FIG. 5 is a perspective view of a holding assembly included in the gas pressure actuator according to the first embodiment.
Figure 6:
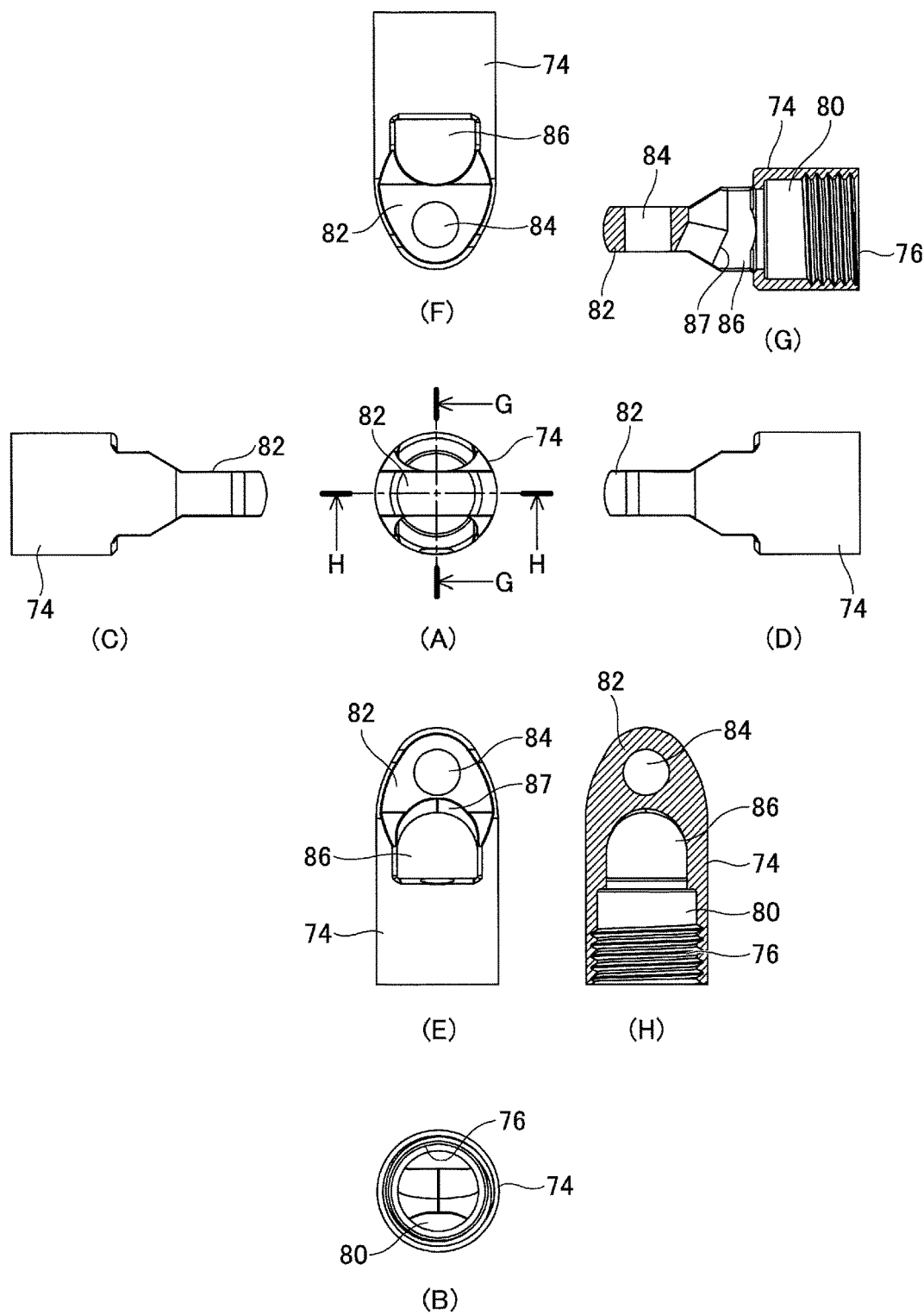
FIG. 6 is a diagram illustrating the holding assembly included in the gas pressure actuator according to the first embodiment.
Figure 7A:
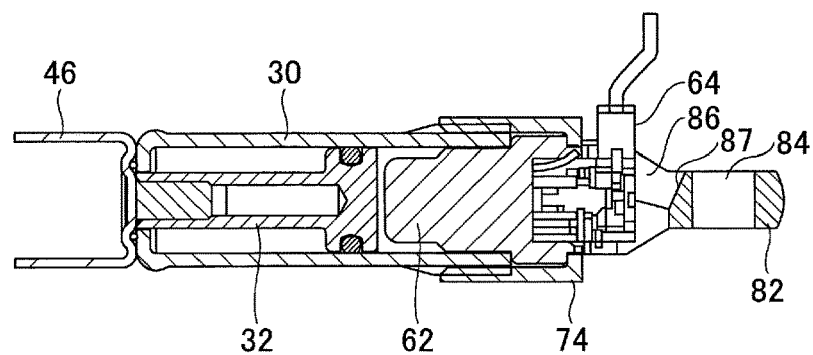
FIG. 7A is an overall cross-sectional view of the gas pressure actuator according to the first embodiment.
Figure 7B:
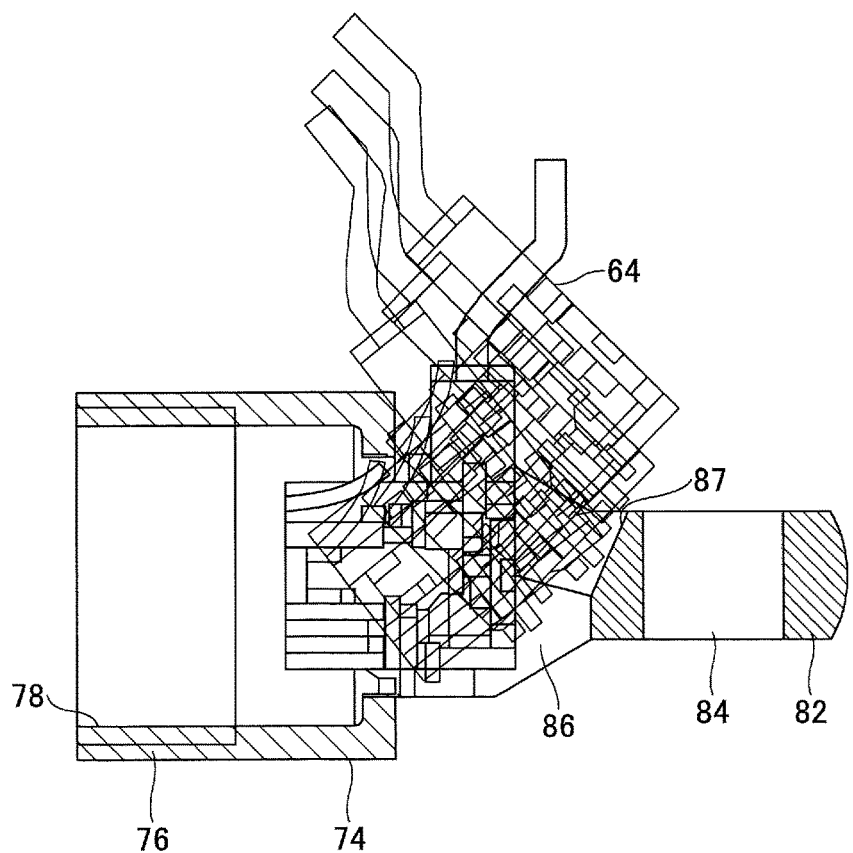
FIG. 7B is a partial cross-sectional view of the gas pressure actuator according to the first embodiment.
Figure 8A:
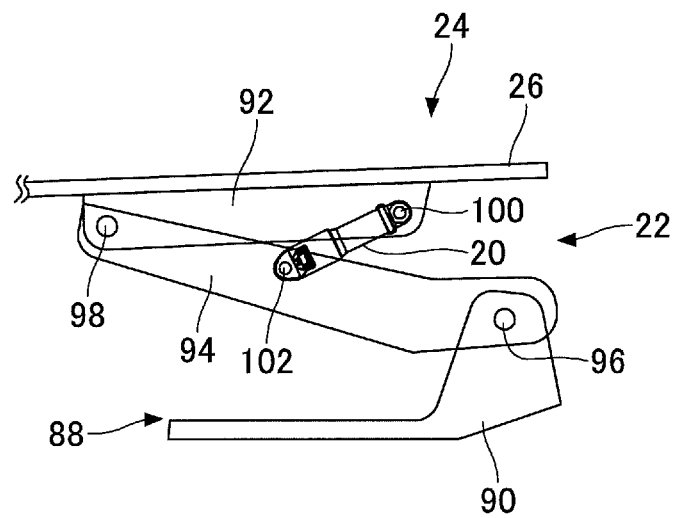
FIG. 8A is a side view of a vehicle safety device prior to driving the gas pressure actuator.
Figure 8B:
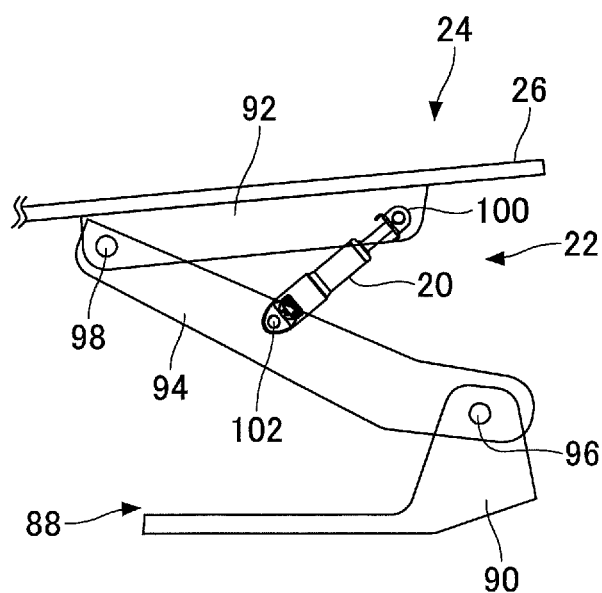
FIG. 8B is a side view of the vehicle safety device after driving the gas pressure actuator.

FIG. 1 shows a cross-sectional view of the gas pressure actuator 20 according to the first embodiment. FIG. 2 shows an exploded perspective view of the gas pressure actuator 20 according to the embodiment. FIG. 3 shows a perspective view of a head assembly included in the gas pressure actuator 20 according to the embodiment. FIGS. 4A through 4C show a top view and side views of the head assembly included in the gas pressure actuator 20 according to the embodiment. FIG. 5 shows a perspective view of a holding assembly included in the gas pressure actuator 20 according to the embodiment. FIG. 6 is a diagram showing the holding assembly included in the gas pressure actuator 20 according to the embodiment. FIGS. 7A and 7B show cross-sectional views of the gas pressure actuator 20 according to the embodiment. Furthermore, FIGS. 8A and 8B show side views of a vehicle safety device 22, which is installed in a vehicle 24 and includes the gas pressure actuator 20 according to the embodiment.

Note that FIGS. 4A through 4C are diagrams corresponding to views A through C in FIG. 3, respectively. Furthermore, in FIG. 6, (A) shows a top view corresponding to a view A in FIG. 5; (B) shows a bottom view corresponding to a view B in FIG. 5; (C) through (F) show side views corresponding to views C through F in FIG. 5, respectively; and (G) and (H) show a cross-section along G-G in (A) and a cross-section along H-H in (A), respectively. FIG. 7A shows an entire cross-sectional view of the gas pressure actuator 20, and FIG. 7B shows a partial cross-sectional view of the gas pressure actuator 20 in which a trajectory of the holding member during assembling is shown. Furthermore, FIG. 8A shows a state of the gas pressure actuator 20 prior to driving, and FIG. 8B shows a state of the gas pressure actuator 20 during driving.

The vehicle safety device 22 is, for example, a safety device for reducing an impact on a pedestrian who collides with or is expected to collide with the vehicle 24. Specifically, the vehicle safety device 22 is a hood lifting device for lifting, upon detecting that the vehicle 24 is to collide with a pedestrian, or upon predicting the collision, a windshield side of a bonnet hood 26 included in the vehicle 24 from below by driving the gas pressure actuator 20.

When the windshield side of the bonnet hood 26 is lifted, a space below the bonnet hood 26 is enlarged, so that a cushioning property of the bonnet hood 26 is enhanced. Consequently, according to the vehicle safety device 22, an impact received from the bonnet hood 26 by a pedestrian collided with a front bumper, etc., of the vehicle 24 can be mitigated, and the pedestrian can be prevented from colliding with the windshield.

In the embodiment, the gas pressure actuator 20 includes a housing 30; and a piston rod 32 (in this specification, the "piston rod" means an assembly in which the "piston" and the "rod" are combined). The housing 30 is formed to have an approximate hollow cylindrical shape and extends along an axis line X. Note that, in this specification, a direction along the axis line X is referred to as an "axial direction," an end (or a side) closer to an end X1 of the axis line X is referred to as "one end (side) in the axial direction," an end (or a side) closer to an end X2 of the axis line X is referred to as "the other end (side) in the axial direction," the axial direction toward the end X1 is referred to as "one side in the axial direction," and the axial direction toward the end X2 is referred to as "the other side in the axial direction." The housing 30 has a predetermined length (e.g., 110 mm) in the axial direction. The housing 30 has a hollow cylindrical space 34 that can accommodate the piston rod 32 and cover a periphery of the piston rod 32 prior to driving the gas pressure actuator 20. The housing 30 is a launching tube for displacing the piston rod 32 accommodated in the cylindrical space 34 in the axial direction.

Prior to driving the gas pressure actuator 20, the piston rod 32 is accommodated in the cylindrical space 34 of the housing 30. The piston rod 32 is arranged on the axis line X of the housing 30 and extends along the axis line X. The piston rod 32 includes a piston 36; and a rod 38.

During driving the gas pressure actuator 20, the piston 36 slides along an inner wall of the housing 30, while being held by the inner wall of the housing 30 through an O-ring 40. The piston 36 is arranged at the one end side in the axial direction in the cylindrical space 34 of the housing 30. Furthermore, the rod 38 is a rod-shaped part that extends along the axis line X. The rod 38 is integrally formed with the piston 36, and the rod 38 is arranged at the other end side in the axial direction with respect to the piston 36.

At the other end side in the axial direction of the housing, a through hole 42 is formed. The through hole 42 is a hole formed on the axis line X and is capable of being inserted by the rod 38 of the piston rod 32. The through hole 42 has a diameter slightly greater than an outer diameter of the rod 38 and has the diameter less than an outer diameter of the piston 36 of the piston rod 32. During driving the gas pressure actuator 20, the rod 38 of the piston rod 32 extends toward the other side in the axial direction from the through hole 42 at the other end side in the axial direction of the housing 30.

At the other end side in the axial direction of the housing 30, a thickened part 44 is formed. The thickened part 44 is a part where the outer diameter side of the housing 30 bulges out. The outer diameter of the thickened part 44 is slightly greater than an outer diameter of any other part of the housing 30. The thickened part 44 is formed over the entire circumference at the other end side in the axial direction of the housing 30.

A head assembly 46 is attached to the other end side in the axial direction of the housing 30 through a gasket 48. The head assembly 46 is an assembly for preventing, prior to driving the gas pressure actuator 20, the piston rod 32 from flying out from the through hole 42, and is the assembly for securing an initial position of the piston rod 32. The head assembly 46 includes a base part 50; and a hook portion 52. The hook portion 52 extends toward the one side in the axial direction from two positions on the disk-shaped base part 50 facing each other. The hook portion 52 is a part for fastening the thickened part 44 of the housing 30. The head assembly 46 is formed of pressed sheet metal components.

It suffices if fastening of the housing 30 by the hook part 52 is performed with the force required for securing the initial position of the piston rod 32 prior to driving the gas pressure actuator 20, and fastening is performed with force to the extent that the piston rod 32 is not prevented from extending along the axis line X during driving the gas pressure actuator 20.

An opening hole 54 is formed in the rod 38 of the piston rod 32. The opening hole 54 opens at the other end side in the axial direction and extends in the direction of the axis line X of the rod 38. The head assembly 46 includes a bolt part 56. The bolt part 56 is inserted into the opening hole 54. The bolt part 56 is secured to the base part 50 by welding, etc. The head assembly 46 secures the initial position of the piston rod 32 by contacting the other end in the axial direction of the rod 38 when the bolt part 56 is inserted into the opening hole 54 and the hook portion 52 fastens the thickened part 44 of the housing 30.

The head assembly 46 includes coupler holes 58. The coupler holes 58 are formed in respective plate parts 60 that extend toward the other side in the axial direction from the two parts on the disk-shaped base part 50 facing each other. The plate parts 60 are planar brackets such that the normal lines extend in a direction perpendicular to the axis line X. Namely, the head assembly 46 is provided with the plate parts 60 as brackets for coupling the gas pressure actuator 20 to the vehicle body side.

The coupling holes 58 are circular holes that pass through the plate parts 60 in a direction perpendicular to the axis line X. The coupling holes 58 of the two plate parts 60 are arranged coaxially. The axis of the coupling holes 58 intersects the axis line X of the gas pressure actuator 20. A middle point of the two coupling holes 58 exists on the axis line X. Namely, the coupling holes 58 of the two plate parts 60 are arranged at symmetrical positions with respect to the axis line X. For example, a bolt (not depicted) is inserted into the coupling holes 58. The head assembly 46, i.e., the other end side in the axial direction of the gas pressure actuator 20, is coupled to a hinge formed in the vehicle body through a bolt, etc., inserted into the coupling holes 58 of the plate parts 60. The position for coupling to the vehicle body hinge exists on the axis line X.

The gas pressure actuator 20 further includes a gas generator 62. The gas generator 62 is a gas generating device for generating high pressure gas. The gas generator 62 is coupled to a controller (not depicted) through an electric connector 64, and operates in accordance with an electric operation command from the controller to generate high pressure gas. As the gas generator 62 generates high pressure gas, the gas pressure actuator 20 is driven and extended.

The gas generator 62 is formed to have an approximate columnar shape, and has a predetermined length in the axial direction (e.g., 30 mm). A part of the gas generator 62 is adjacent to the piston rod 32 at the one side in the axial direction and accommodated in the cylindrical space 34 of the housing 30. The periphery is covered with the housing 30. Furthermore, the remaining part of the gas generator 62 protrudes from the housing 30 toward the one side in the axial direction. Note that the entire gas generator 62 may be accommodated in the cylindrical space 34 to be covered with the housing 30. The gas generator 62 is arranged on the axis line X at the one end side in the axial direction of the housing 30. The electric connector 64 is coupled to the one end side in the axial direction of the gas generator 62.

An opening hole 66 that opens in an approximate circular shape toward the one end side in the axial direction is formed on an end face of the housing 30 at the one end side in the axial direction. The gas generator 62 includes a large diameter part 68 and a small diameter part 70. The outer diameter of the large diameter part 68 is greater than the outer diameter of the small diameter part 70. The large diameter part 68 is arranged at the one end side in the axial direction. Furthermore, the small diameter part 70 is integrally formed with the large diameter part 68, and the small diameter part 70 is arranged at the other end side in the axial direction with respect to the large diameter part 68.

The large diameter part 68 has the outer diameter that is greater than the diameter of the opening hole 66 of the housing 30. The small diameter part 70 has the diameter that is almost equal to an inner diameter of the cylindrical space 34 of the housing 30, or that is slightly smaller than the inner diameter of the cylindrical space 34. Consequently, the small diameter part 70 fits the opening hole 66, so that the gas generator 62 is accommodated in the cylindrical space 34, and a boundary part (a step part) between the large diameter part 68 and the small diameter part 70 is arranged to contact an end part of the housing 30 at the one end side in the axial direction. The gas generator 62 and the end part of the housing 30 at the one end side in the axial direction face each other in the axial direction through a gasket 72.

Furthermore, the gas pressure actuator 20 includes a holding assembly (keeper) 74. The holding assembly 74 is a component for securing the gas generator 62 to the one end side in the axial direction of the housing 30. The holding assembly 74 is formed to have an approximate cylindrical shape. Inside the cylinder of the holding assembly 74, a screw part 76 is formed, in which an internal thread is shaped. On an outer wall of the housing 30 at the one end side in the axial direction, a screw part 78 is formed, in which an external thread is shaped. The screw part 76 of the holding assembly 74 is screwed with the screw part 78 of the housing 30.

The holding assembly 74 has a cylindrical inner space 80 in which the large diameter part 68 of the gas generator 62 is accommodated. While accommodating the gas generator 62 in the inner space 80, the holding assembly 74 annularly supports the gas generator 62 by contacting the one end side in the axial direction of the gas generator 62. The holding assembly 74 is secured to the housing 30 by screwing the screw part 76 with the screw part 78 of the housing 30 in a state in which the large diameter part 68 of the gas generator 62 is accommodated in the inner space 80. At this time, the gas generator 62 is supported by the holding assembly 74 to be secured to the one end side in the axial direction of the housing 30.

The holding assembly 74 includes a bracket part 82 for coupling the gas pressure actuator 20 to the vehicle body side. The bracket part 82 is a thick plate shaped part extending toward the one side in the axial direction from the cylindrical main body of the holding assembly 74. In the bracket part 82, a coupler hole 84 is formed. Namely, in the holding assembly 74, the coupler hole 84 is formed. The coupler hole 84 passes through the bracket part 82 in the direction perpendicular to the axis line X. The coupler hole 84 is formed to have an approximate circular shape. The coupler hole 84 is formed so that the axis of the coupler hole 84 intersects the axis line X of the gas pressure actuator 20 and is located on the axis line X.

For example, a bolt (not depicted) is inserted into the coupler hole 84 of the bracket part 82. The holding assembly 74, i.e., the one end side in the axial direction of the gas pressure actuator 20 is coupled to a hinge formed in the vehicle body through a bolt, etc., inserted into the coupler hole 84 of the holding assembly 74. The position for coupling to the vehicle body hinge exists on the axis line X.

Furthermore, in the holding assembly 74, an insertion hole 86 is formed. The insertion hole 86 communicates the inner space 80 in which the large diameter part 68 of the gas generator 62 is accommodated. The insertion hole 86 is an insertion opening for inserting the electric connector 64, so that the electric connector 64 is to be connected to the one end side in the axial direction of the gas generator 62, after securing the gas generator 62 by the holding assembly 74.

The insertion hole 86 is a through hole passing through the holding assembly 74. The insertion hole 86 is formed to have an approximate semicircular shape. The opening of the insertion hole 86 and the opening of the coupler hole 84 are formed on the same surface (side surface) of the holding assembly 74. Namely, the surface in which the insertion hole 86 is formed is the surface that is the same as the surface in which the coupler hole 84 is formed. The direction in which the insertion hole 86 passes through the holding assembly 74 and the direction in which the coupler hole 84 passes through the bracket part 82 of the holding assembly 74 are mutually the same. The insertion hole 86 and the coupler hole 84 are not communicating, and a part of the bracket part 82 exists between the insertion hole 86 and the coupler hole 84.

The insertion hole 86 has a size that is necessary and sufficient for inserting the electric connector 64 from one surface side of the planar bracket part 82. The insertion hole 86 forms a passage in which the electric connector 64 passes after the electric connector 64 is inserted into the opening of the insertion hole 86 until the electric connector 64 is coupled to the gas generator 62. In the holding assembly 74, the insertion hole 86 has an asymmetric shape.

The insertion hole 86 is formed so that the opening on the side from which the electric connector 64 is inserted has the largest cross sectional area and the cross sectional area becomes smaller as the position becomes deeper from the opening. Namely, the insertion hole 86 is formed so that it gradually becomes smaller as the position becomes deeper from the opening for the insertion. Furthermore, the insertion hole 86 is formed so that it has almost the same cross sectional area from the vicinity of the central part in the passing direction to the opening on the side opposite to the opening for inserting the electric connector 64.

In the holding assembly 74, a tilted surface 87 is formed on a side wall forming the insertion hole 86. The tilted surface 87 is a surface that is tilted with respect to the direction in which the insertion hole 86 passes through. The tilted surface 87 is formed on the side wall forming the insertion hole 86 at a side opposite to the side at which the electric connector 64 connects to the gas generator 62, namely, at a side at which the coupler hole 84 is formed. The tilted surface 87 is formed so that the insertion hole 86 (specifically, its cross sectional area) becomes smaller, as the position from the opening of the insertion hole 86 for inserting the electric connector 64 becomes deeper (specifically, in the vicinity of the central part in the passing direction).

Note that the tilted surface 87 of the holding assembly 74 may be formed to be planar so that the insertion hole 86 becomes linearly smaller as the position becomes deeper from the opening of the insertion hole 86, or may be formed to be a curved surface or a spherical surface so that the insertion hole 86 becomes acceleratingly smaller. Furthermore, in the structure in which the insertion hole 86 is formed to have the asymmetrical shape in the holding assembly 74, as in the embodiment, the shape and the thickness distribution of the holding assembly 74 are adjusted, so that the stress distribution of the holding assembly 74 during driving the gas pressure actuator 20 is prevented from being biased due to the asymmetrical shape of the holding assembly.

Furthermore, in the holding assembly 74, the insertion hole 86 may be formed to have the asymmetrical shape, as described above; however, the insertion hole 86 may be formed to have a symmetrical shape. Namely, in the holding assembly 74, the tilted surface 87 may be formed from each of the openings on both sides of the insertion hole 86 to the vicinity of the central part in the passing direction. As described above, in the structure in which the insertion hole 86 is formed to have the symmetrical shape in the holding assembly 74 and the tilted surface 87 is formed so as to correspond to respective openings on both sides, the electric connector 64 can be inserted from each of the openings, so that installation of the electric connector 64 to the gas generator 62 can be facilitated.

Furthermore, it suffices if the insertion hole 86 includes, at least, an opening at one surface side of the holding assembly 74 for inserting the electric connector 64. As described above, the insertion hole 86 may pass through the holding assembly 74 in the direction perpendicular to the axis line X; however, the insertion hole 86 may not pass through it. Namely, in the holding assembly 74, the insertion hole 86 may open at the side for inserting the electric connector 64 and communicate the inner space 80, while the insertion hole 86 may not open at the side opposite to the opening.

The vehicle safety device 22 includes the gas pressure actuator 20 having the above-described structure; and a hinge 88 to be attached to the vehicle body. The hinge 88 includes a lower hinge 90; a first upper hinge 92; and a second upper hinge 94. The lower hinge 90 is a hinge to be secured to the vehicle body. The first upper hinge 92 is a hinge to be secured to the bonnet hood 26.

The second upper hinge 94 is a hinge for coupling the lower hinge 90 and the first upper hinge 92 such that the second upper hinge 94 is coupled to the lower hinge 90 at a coupling point 96 and the second upper hinge 94 is coupled to the first upper hinge 92 at a coupling point 98. The second upper hinge 94 is pivotable with respect to the lower hinge 90 around the coupling point 96. Additionally, the second upper hinge 94 is pivotable with respect to the first upper hinge 92 around the coupling point 98.

In the gas pressure actuator 20, the head assembly 46 is coupled to a coupling point 100 at an end part of the first upper hinge 92 opposite to the coupling point 98 by inserting a bolt, etc., into the coupler hole 58. Additionally, the holding assembly 74 is coupled to a coupling point 102 in the middle of the second upper hinge 94 by inserting a bolt, etc., into the coupler hole 84. The gas pressure actuator 20 causes the windshield side of the bonnet hood 26 to be lifted upward from the vehicle body side by separating the coupling point 100 of the first upper hinge 92 from the coupling point 102 of the second upper hinge 94 by extending in the direction of the axis line X.

In the following, a procedure for assembling the gas pressure actuator 20 according to the embodiment is described.

In the embodiment, in order to assemble the gas pressure actuator 20, first, the piston rod 32 in which the O-ring 40 is fitted into the large diameter part 68 is inserted into the housing 30 from the one end side in the axial direction of the housing 30. After that, the head assembly 46 is attached to the housing 30 through the gasket 48 from the other end side in the axial direction of the housing 30. At this time, the head assembly 46 is attached, so that the bolt part 56 is inserted into the opening hole 54 of the rod 38 of the piston rod 32 and the hook portion 52 fastens the thickened part 44 of the housing 30. When the bolt part 56 is inserted into the opening hole 54 and the hook portion 52 fastens the thickened part 44, the head assembly 46 contacts the rod 38 and the piston rod 32 is secured to the initial position.

Furthermore, after inserting the piston rod 32 into the housing 30, the gas generator 62 is inserted into the housing 30 through the gasket 72 from the one end side in the axial direction of the housing 30. After that, the holding assembly 74 is attached to and secured to the housing 30 from the one end side in the axial direction of the housing 30. At this time, the screw part 76 of the holding assembly 74 is screwed with the screw part 78 of the housing 30.

Next, the electric connector 64 is inserted into the insertion hole 86 of the holding assembly 74 from one surface side of the bracket part 82, and the electric connector 64 is coupled to the gas generator 62 existing in the inner space 80 of the holding assembly 74. As a result, the gas generator 62 is coupled to the controller through the electric connector 64 and becomes operable.

After that, the vehicle safety device 22 is completed by securing the gas pressure actuator 20 to the vehicle body by coupling the head assembly 46 to the first upper hinge 92 at the coupling point 100 and coupling the holding assembly 74 to the second upper hinge 94 at the coupling point 102.

In the following, an operation of the gas pressure actuator 20 according to the embodiment is described by referring to FIG. 9A through FIG. 10B.

Figure 9A:
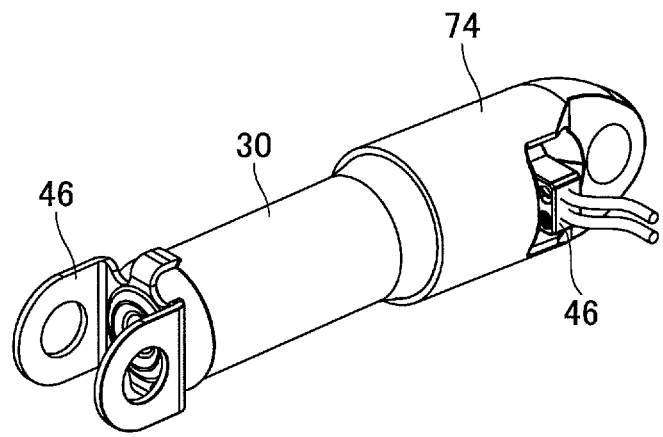
FIG. 9A is a perspective view illustrating the gas pressure actuator prior to driving.
Figure 9B:
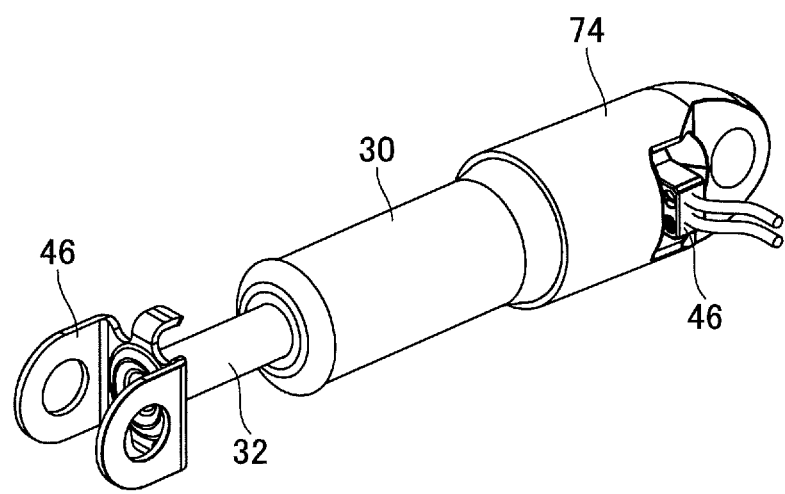
FIG. 9B is a perspective view illustrating the gas pressure actuator after driving.
Figure 10A:
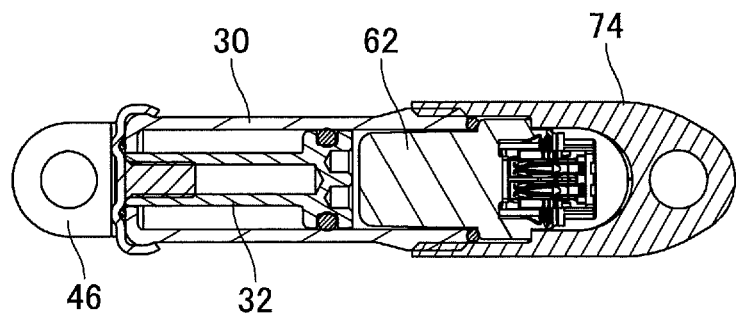
FIG. 10A is a cross-sectional view illustrating the gas pressure actuator prior to driving.
Figure 10B:
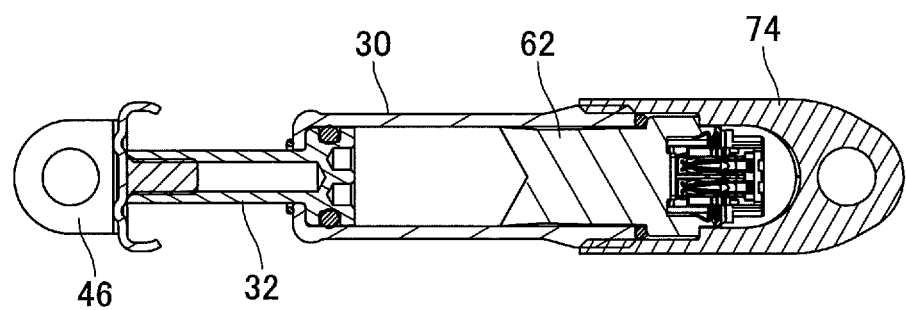
FIG. 10B is a cross-sectional view illustrating the gas pressure actuator after driving.

FIGS. 9A and 9B are perspective views respectively showing states prior to driving and after driving the gas pressure actuator 20 according to the embodiment. Furthermore, FIGS. 10A and 10B are cross-sectional views respectively showing the states prior to driving and after driving the gas pressure actuator 20 according to the embodiment. Note that FIG. 9A and FIG. 10A show the gas pressure actuator 20 prior to driving; and FIG. 9B and FIG. 10B show the gas pressure actuator 20 after driving.

After assembling, as described above, the gas pressure actuator 20 according to the embodiment, the piston rod 32 is accommodated in the cylindrical space 34 of the housing 30 prior to driving the gas pressure actuator 20, as shown in FIG. 9A and FIG. 10A. In response to detecting or predicting a collision with a pedestrian in such a state and detecting, by the controller, a state in which the gas pressure actuator 20 is to be driven, an operation command is transmitted from the controller to the gas generator 62 through the electric connector 64.

When the operation command is transmitted to the gas generator 62, the gas generator 62 operates to generate high pressure gas. The generated high pressure gas flows into the space between the gas generator 62 and the piston rod 32 adjacent to the other end side in the axial direction of the gas generator 62. Soon after the high pressure gas flows in, the piston 36 slides along the inner wall of the housing 30, and the piston rod 32 displaces toward the other side in the axial direction with respect to the housing 30. At this time, as shown in FIG. 9B and FIG. 10B, the other end side in the axial direction of the piston rod 32 presses the head assembly 46 toward the other side in the axial direction and extends from the other end side in the axial direction of the housing 30.

The vehicle safety device 22 is caused to operate by extending the gas pressure actuator 20 by the displacement of the piston rod 32. In this case, the windshield side of the bonnet hood 26 of the vehicle is lifted upward, and a large space is formed below the bonnet hood 26. Consequently, according to the embodiment, an impact received from the bonnet hood 26 by a pedestrian collided with the vehicle can be mitigated, and the pedestrian, etc., can be prevented from colliding with the windshield.

Furthermore, in the gas pressure actuator 20 according to the embodiment, the coupler hole 84 is formed in the holding assembly 74 for securing the gas generator 62 to the one end side in the axial direction of the housing 30. The coupler hole 84 is a hole for inserting a bolt, etc., for coupling the entire gas pressure actuator 20 to the vehicle body side. Namely, the holding assembly 74 has a function for securing the gas generator 62 to the one end side in the axial direction of the housing 30, and has a function as a bracket for coupling the gas pressure actuator 20 to the vehicle body side.

The coupler hole 84 of the holding assembly 74 is formed on the axis line X of the gas pressure actuator 20. The coupler hole 84 is for coupling the holding assembly 74 to the second upper hinge 94 at a position on the axis line X. In the structure in which the holding assembly 74 is coupled to the second upper hinge 94 at a position that is offset from the axis line X of the gas pressure actuator 20, when the gas pressure actuator 20 is driven, a large moment acts on the gas pressure actuator 20 around the offset position. In contrast, in the structure of the embodiment, the holding assembly 74 is coupled to the second upper hinge 94 at the position on the axis line X, and driving of the gas pressure actuator 20 is performed on the axis line X. Consequently, according to the embodiment, the moment that acts around the position at which the holding assembly 74 and the vehicle hinge are coupled during driving the gas pressure actuator 20 can be reduced, so that the gas pressure actuator 20 can be efficiently driven.

Furthermore, in the structure in which the holding assembly 74 is coupled to the second upper hinge 94, it is not required to form a hole for inserting a bolt for coupling the gas pressure actuator 20 to the vehicle hinge in the housing 30 itself, which is a pressure container. Consequently, lowering of the dust resistance and the drip-proofness of the housing 30 due to the existence of such a hole do not occur, and lowering of the airtightness due to the existence of such a hole does not occur. Consequently, according to the embodiment, the dust resistance and the drip-proofness of the housing 30 can be ensured prior to driving the gas pressure actuator 20, and, during driving, the airtightness of the housing 30 can be ensured by making it difficult for the high pressure gas to leak from inside the housing 30.

Thus, according to the gas pressure actuator 20 of the embodiment, the moment that acts around the coupling part during driving can be reduced while ensuring the dust resistance and the drip-proofness of the housing 30. Furthermore, when the hole for inserting the bolt exists in the housing 30, an additional component is required to ensure the dust resistance and the drip proofness; however, in the configuration of the embodiment, such an additional component is not required, so that the dust resistance and the drip-proofness of the housing 30 can be ensured with a simple structure. Furthermore, when a large moment acts around the coupling part during driving, it is required to provide a strong bracket, etc., that can resist the moment; however, in the configuration of the embodiment, such a bracket is not required, so that the gas pressure actuator 20 can be simplified and lightened, and the cost can be reduced.

Furthermore, in the gas pressure actuator 20 according to the embodiment, the coupler holes 58 are formed in the head assembly 46 for securing the piston rod 32 to the initial position prior to driving. The coupler holes 58 are holes for inserting a bolt, etc., for coupling the entire gas pressure actuator 20 to the vehicle body side. Namely, the head assembly 46 has a function for securing the initial position of the piston rod 32, and has a function as a bracket for coupling the gas pressure actuator 20 to the vehicle body side.

The axis of the two coupler holes 58 of the head assembly 46 intersects the axis line X of the gas pressure actuator 20. These coupler holes 58 are for coupling the head assembly 46 to the first upper hinge 92 at a position on the axis line X. In the structure in which the head assembly 46 is coupled to the first upper hinge 92 at a position that is offset from the axis line X of the gas pressure actuator 20, a large moment acts on the gas pressure actuator 20 around the offset position during driving the gas pressure actuator 20. In contrast, in the structure of the embodiment, the head assembly 46 is coupled to the first upper hinge 92 at the position on the axis line X, and driving of the gas pressure actuator 20 is performed on the axis line X. Consequently, according to the embodiment, the moment that acts around the part at which the head assembly 46 is coupled to the vehicle hinge during driving the gas pressure actuator 20 can be reduced, so that the gas pressure actuator 20 can be efficiently driven.

Furthermore, in the gas pressure actuator 20 according to the embodiment, the insertion hole 86 is formed in the holding assembly 74. The insertion hole 86 is a hole required for coupling the electric connector 64 to the gas generator 62, and the insertion hole 86 forms a passage in which the electric connector 64 passes after the electric connector 64 is inserted into the opening of the insertion hole 86 until the electric connector 64 is coupled to the gas generator 62. Specifically, the insertion hole 86 is formed in the holding assembly 74 so that it gradually becomes smaller as the position becomes deeper from the opening for the insertion. In the holding assembly 74, the tilted surface 87 is formed on a side wall forming the insertion hole 86 so that the insertion hole 86 becomes smaller as the position becomes deeper from the opening.

By the tilted surface 87, the insertion hole 86 can be made smaller as much as possible, and the thickness of the holding assembly 74 can be maintained as much as possible. Namely, the holding assembly 74 can be made compact while suppressing a decrease in the strength of the holding assembly 74, so that an increase in the size (total length) of the gas pressure actuator 20 itself can be prevented as much as possible.

Furthermore, the opening of the insertion hole 86 and the opening of the coupler hole 84 for coupling the holding assembly 74, i.e., the gas pressure actuator 20, to the vehicle hinge are formed on the same surface (side surface) of the holding assembly 74. Namely, the surface on which the insertion hole 86 is formed is the same as the surface on which the coupler hole 84 is formed.

In such a structure, the insertion hole 86 and the coupler hole 84 are formed so as to face the same direction in the holding assembly 74, so that a part can be formed that continuously extends in the axial direction of the gas pressure actuator 20 on both side surfaces of the holding assembly 74 where the coupler hole 84 is not formed. Consequently, according to the embodiment, the strength of the holding assembly 74 as a bracket can be ensured compared to a structure in which the insertion hole 86 and the coupler hole 84 are formed to face mutually different directions in the holding assembly 74, such as a case where the direction in which the insertion hole 86 passes through the holding assembly 74 is perpendicular to the direction in which the coupler hole 84 passes through the holding assembly 74. Consequently, it is not required to separately take measures for strengthening the holding assembly 74, so that the cost for the gas pressure actuator 20 can be reduced, and the gas pressure actuator 20 can be properly driven.

Note that, in the above-described first embodiment, the second upper hinge 94 is an example of "a first hinge (a first body hinge or a first hinge of a vehicle)," and the first upper hinge 92 is an example of "a second hinge (a first body hinge or a first hinge of a vehicle)."

Second Embodiment

Figure 11A:
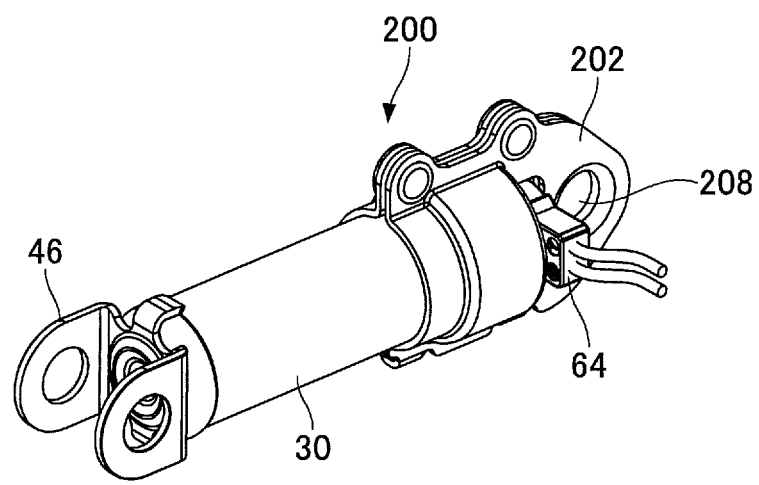
FIG. 11A is a perspective view of the gas pressure actuator according to a second embodiment.
Figure 11B:
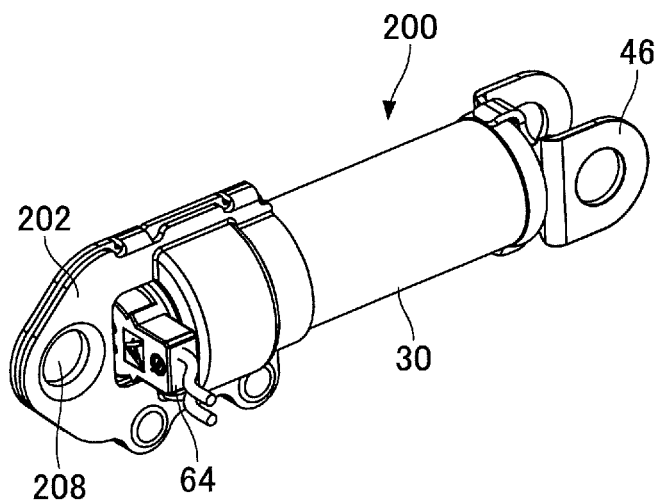
FIG. 11B is a perspective view of the gas pressure actuator according to the second embodiment.
Figure 12A:
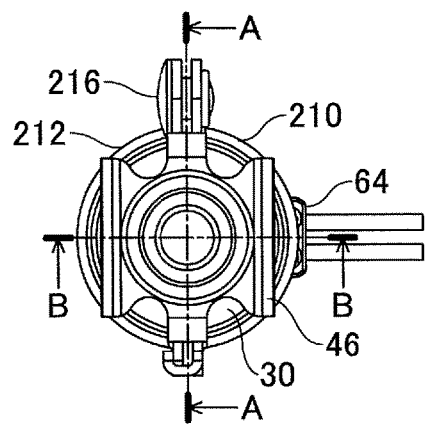
FIG. 12A is a top view of the gas pressure actuator according to the second embodiment.
Figure 12B:
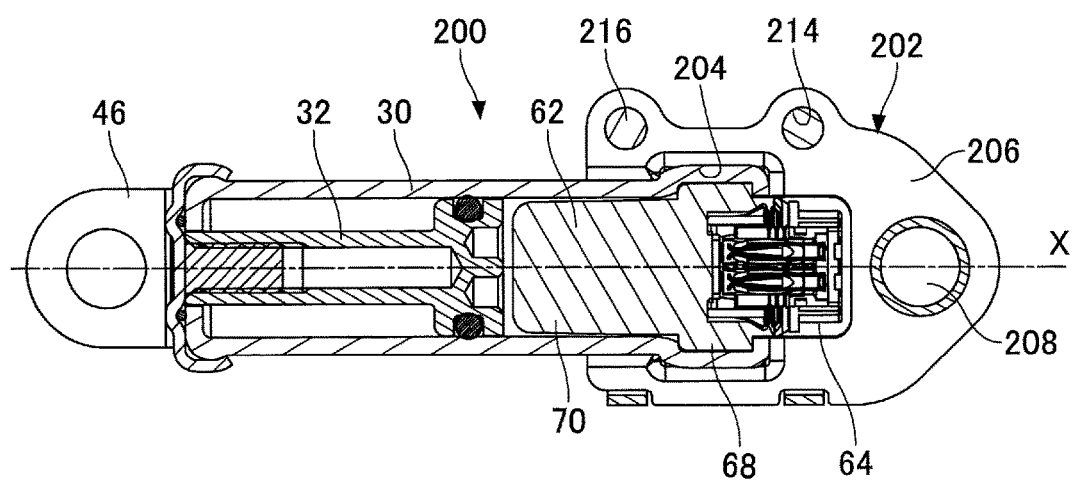
FIG. 12B is a cross-sectional view of the gas pressure actuator according to the second embodiment.
Figure 12C:
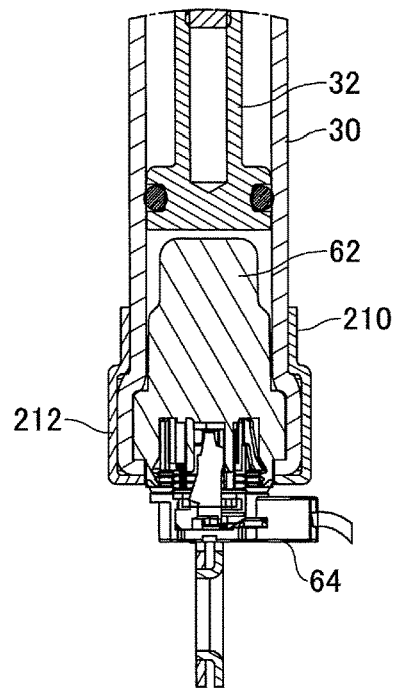
FIG. 12C is a cross-sectional view of the gas pressure actuator according to the second embodiment.
Figure 13:
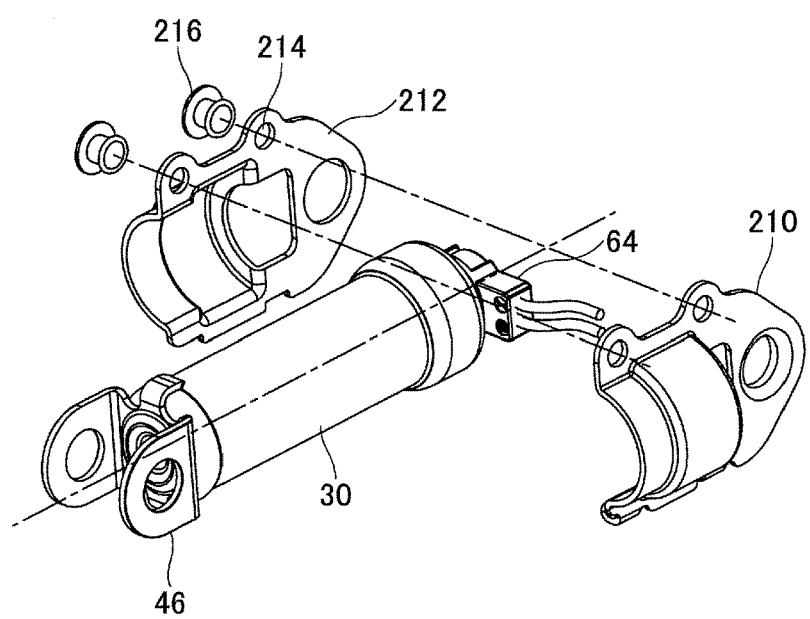
FIG. 13 is a diagram illustrating a state in which a holding assembly is detached from a housing of the gas pressure actuator according to the second embodiment.
Figure 14A:
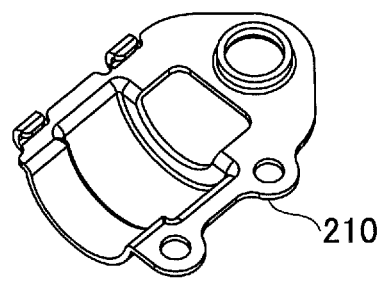
FIG. 14A is a perspective view of a first divided assembly of the holding assembly.

FIGS. 11A and 11B show perspective views of a gas pressure actuator 200 according to a second embodiment of the present invention. FIGS. 12A through 12C are a top view and cross-sectional views of the gas pressure actuator 200 according to the embodiment. FIG. 13 is a diagram illustrating a state in which a holding assembly is detached from a housing of the gas pressure actuator 200 according to the embodiment. Furthermore, FIGS. 14A and 14B show perspective views of divided assemblies of the holding assembly included in the gas pressure actuator 200 according to the embodiment.

Figure 14B:
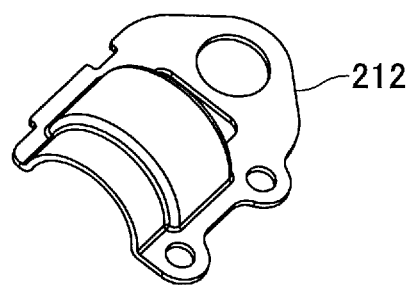
FIG. 14B is a perspective view of a second divided assembly of the holding assembly.

Note that, in FIG. 11A through FIG. 14B, the same reference numerals are attached to the components that are the same as the components shown in FIG. 1 through FIG. 6, and the descriptions thereof are omitted or simplified. Furthermore, FIGS. 11A and 11B respectively show the perspective views of the gas pressure actuator 200 when viewed from mutually different directions. FIG. 12A shows the top view of the gas pressure actuator 200 as viewed from the axial direction; FIG. 12B shows the cross-sectional view along A-A in FIG. 12A; and FIG. 12C shows the cross-sectional view along B-B in FIG. 12A. Furthermore, FIGS. 14A and 14B show perspective views of the divided assemblies included in the holding assembly, respectively.

The gas pressure actuator 200 according to the embodiment is different from the gas pressure actuator 20 according to the first embodiment mainly in a point that a holding assembly 202 is included instead of the holding assembly 74 of the above-described first embodiment. The holding assembly 202 is an assembly for securing the gas generator 62 to the one end side in the axial direction of the housing 30. The holding assembly 202 includes a cylindrical inner space 204; and a bracket part 206. In the inner space 204, at least the large diameter part 68 of the gas generator 62 is accommodated, and the electric connector 64 is accommodated. The inner space 204 has a size that can accommodate the large diameter part 68 of the gas generator 62 and the electric connector 64.

The bracket part 206 is a part for coupling the gas pressure actuator 200 to the vehicle body side, and the bracket part 206 is a plate shaped part extending from the cylindrical main body of the holding assembly 202 toward the one side in the axial direction. A coupler hole 208 is formed in the bracket part 206. Namely, the coupler hole 208 is formed in the holding assembly 202. The coupler hole 208 is a circular hole that passes through the bracket part 206 in a direction perpendicular to the axis line X. The axis of the coupler hole 208 intersects the axis line X of the gas pressure actuator 200, and the coupler hole 208 is formed on the axis line X. For example, a bolt (not depicted) is inserted into the coupler hole 208 of the bracket part 206. The holding assembly 202, i.e., the one end side in the axial direction of the gas pressure actuator 200 is coupled to a hinge formed in the vehicle body through a bolt, etc., inserted into the coupler hole 208 of the holding assembly 202. The position for coupling to the vehicle hinge exists on the axis line X.

The holding assembly 202 is formed of a first divided assembly 210 and a second divided assembly 212. The first divided assembly 210 and the second divided assembly 212 are configured so that the inner space 204, the bracket part 206, and the coupler hole 208 are formed. The first divided assembly 210 and the second divided assembly 212 have approximate plane symmetrical shapes. Note that, in the first divided assembly 210 and the second divided assembly 212, a part at which one engages the other during integration of the both assemblies may not be plane symmetrical. The first divided assembly 210 and the second divided assembly 212 are assembled and integrated, so that both the gas generator 62 accommodated in the cylindrical space 34 of the housing 30 and the electric connector 64 coupled to the gas generator 62 are nipped.

In the holding assembly 202, one or more rivet holes 214 are formed. For example, the rivet holes 214 are formed at two positions. A rivet 216 is inserted into each rivet hole 214. By inserting the rivets 216 to respective rivet holes 214, the first divided assembly 210 and the second divided assembly 212 are integrated. The integration of the first divided assembly 210 and the second divided assembly 212 is performed after coupling the electric connector 64 to the gas generator 62.

As a structure for securing the gas generator 62 to the one end side in the axial direction of the housing 30 by the holding assembly 202, as shown in FIGS. 12B and 12C, the gas generator 62 may be secured to the one end side in the axial direction of the housing 30 by caulking, and the holding assembly 202 may be arranged to contact the one end side in the axial direction of the part that is secured by caulking. Furthermore, similar to the holding assembly 74 shown in FIG. 1, the holding assembly 202 may be arranged to directly contact the one end side in the axial direction of the gas generator 62.

In the structure of the gas pressure actuator 200 according to the embodiment, an effect can be obtained that is the same as the effect of the gas pressure actuator 20 according to the first embodiment. Furthermore, after the electric connector 64 is coupled to the gas generator 62 inserted into the housing 30, the holding assembly 202 is attached to and secured to the housing 30 by integrating the first divided assembly 210 and the second divided assembly 212 of the holding assembly 202. According to such a structure, the space of the holding assembly 202 for accommodating the gas generator 62 and the electric connector 64 can be reduced, compared to a structure in which the holding assembly 202 is attached to and secured to the housing 30 and the electric connector 64 is coupled to the gas generator 62 after accommodating the gas generator 62. Consequently, the holding assembly 202 can be made compact, so that the increase in the size (total length) of the gas pressure actuator 20 itself can be suppressed, as much as possible.

In the above-described first and second embodiments, only one coupler hole 84, 208 is formed in the bracket part 82, 206 of the holding assembly 74, 202, and the coupler holes 58, which are coaxial, are formed in two plate parts 60 of the head assembly 46, respectively. However, the present invention is not limited to this. For example, the holding assembly 74, 292 includes two bracket parts, and the coupler holes 84, 202 may be coaxially formed in the two bracket parts. Furthermore, only one coupler hole 58 may be formed in the head assembly 46. However, it is preferable that the head assembly 46 and the holding assembly 74, 202 be formed, so that, during driving the gas pressure actuator 20, 202, force acts on the gas pressure actuator 20, 202 symmetrically with respect to the axis line X.

The preferred embodiments of the present invention are described above; however, the present invention is not limited to the above-described specific embodiments, and various modifications and alterations may be made within the scope of the gist of the present invention described in the claim.

The present application is based on and claims the benefit of priority of Japanese priority application No. 2015-074285 filed on Mar. 31, 2015, the entire contents of which are hereby incorporated herein by reference.

DESCRIPTION OF REFERENCE SYMBOLS

20, 200 gas pressure actuator
22 vehicle safety device
30 housing
32 piston rod
46 head assembly
58 coupler hole
60 plate part
62 gas generator
64 electric connector
74, 202 holding assembly
82, 206 bracket part
84, 208 coupler hole
86 insertion hole
87 tilted surface
92 first upper hinge
94 second upper hinge

The invention claimed is:
1. A gas pressure actuator comprising:
a cylindrical housing;
a piston rod, the piston rod being accommodated inside the housing prior to driving the gas pressure actuator;
a gas generator arranged at one end side in an axial direction of the housing, wherein, during driving the gas pressure actuator, the gas generator causes the piston rod to extend from the housing by generating high pressure gas;
a holding assembly that secures the gas generator to the one end side in the axial direction of the housing; and
an electric connector for electrically coupling the gas generator to an external device,
wherein the holding assembly is provided with a first coupler hole for coupling the gas pressure actuator to a first hinge at a first position on an axis line of the gas pressure actuator, and
wherein the holding assembly is provided with an insertion hole for inserting the electric connector inside the holding assembly, so that the electric connector is coupled to the gas generator.

2. The gas pressure actuator according to claim 1, wherein an opening of the insertion hole and an opening of the first coupler hole are formed on a same surface of the holding assembly.

3. The gas pressure actuator according to claim 1, wherein the insertion hole is formed such that the insertion hole gradually becomes smaller, as a position becomes deeper from the opening for inserting the electric connector.

4. The gas pressure actuator according to claim 1, wherein the insertion hole has a size that is necessary and sufficient for inserting the electric connector from one surface side of the holding assembly.

5. The gas pressure actuator according to claim 1, further comprising:
    a head assembly that secures an initial position of the piston rod, prior to driving the gas pressure actuator,
    wherein the head assembly is provided with a second coupling hole for coupling the gas pressure actuator to a second hinge at a second position on the axis line.

\* \* \* \* \*